United States Patent

[11] 3,591,905

[72] Inventor Gilbert James Elderbaum
   3381-A 7th Ave., San Diego, Calif.
[21] Appl. No. 832,963
[22] Filed June 13, 1969
[45] Patented July 13, 1971

[54] PROCESS OF MANUFACTURING CAPACITORS IN MULTIPLE
   10 Claims, 5 Drawing Figs.
[52] U.S. Cl. .................................................. 29/25.42,
   29/530, 117/4, 117/8, 117/212, 117/227, 317/261
[51] Int. Cl. .............................................. H01g 13/00
[50] Field of Search ................................... 29/25.42,
   530; 317/242, 261; 117/4, 212, 8, 227

[56] References Cited
   UNITED STATES PATENTS
| | | | |
|---|---|---|---|
| 1,517,370 | 12/1924 | Marbury | 29/25.42 X |
| 2,303,391 | 12/1942 | Rosenthal | 317/242 |
| 2,438,592 | 3/1948 | White | 29/25.42 X |
| 3,469,294 | 9/1969 | Hayashi et al. | 29/25.42 |

FOREIGN PATENTS
218,218  3/1942  Switzerland .............. 317/261

Primary Examiner—John F. Campbell
Assistant Examiner—Carl E. Hall
Attorney—Conrad C. Caldwell ABSTRACT: The process consists in applying electric current conducting material to the sides of a sheet of dielectric material, at least one side being provided with a plurality of recesses juxtaposed, but isolated, from the conducting material on the other side.

The process further consists in employing a fluid containing the electric current conducting material, an ingredient which adheres to the dielectric material and to the conducting material when heated, and including a combustible carrier. After the fluid is applied to the opposite sides of the dielectric sheet, the assembly is subjected to heat to oxidize the combustible carrier and cause the conducting material to adhere to the sheet. Thereafter, the sheet is severed in a manner to form capacitors in units.

PATENTED JUL 13 1971  3,591,905
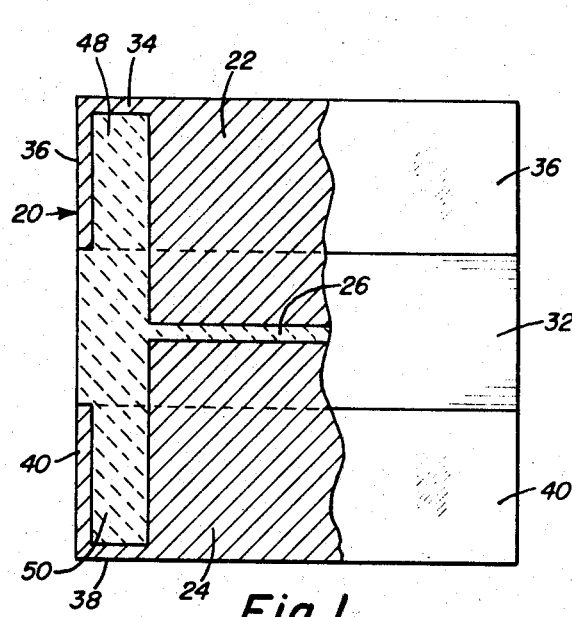
Fig.1
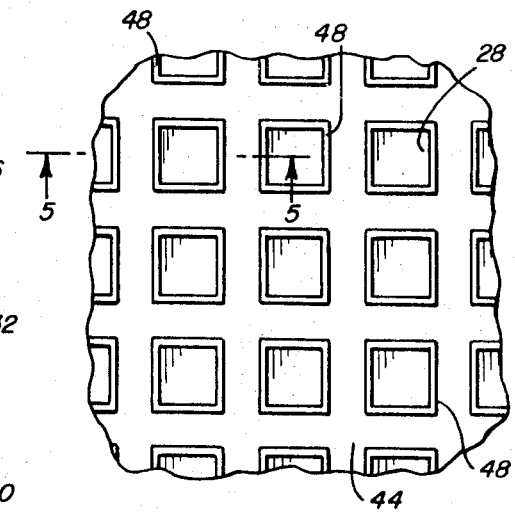
Fig.4
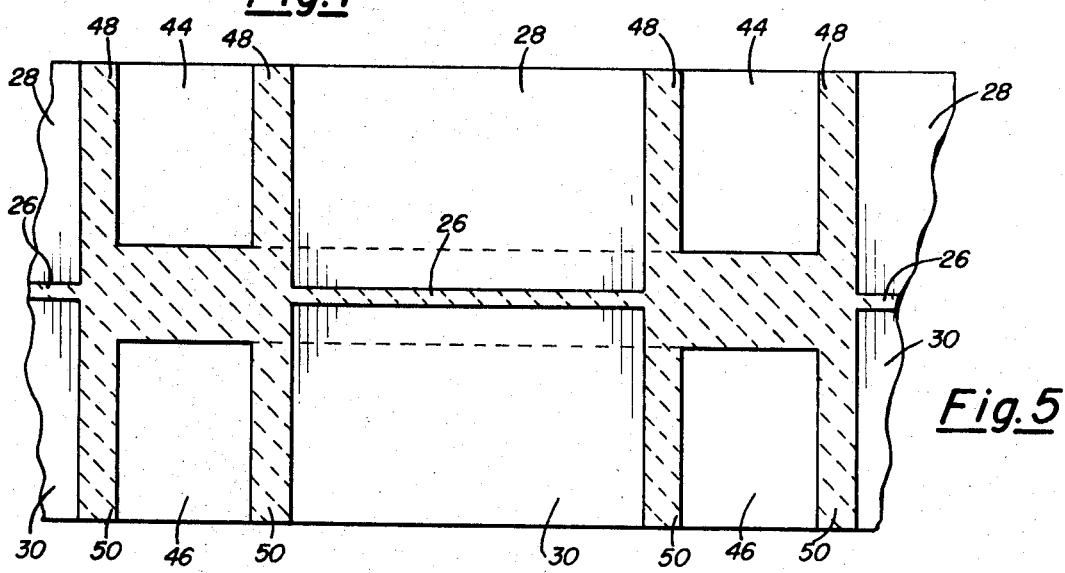
Fig.5
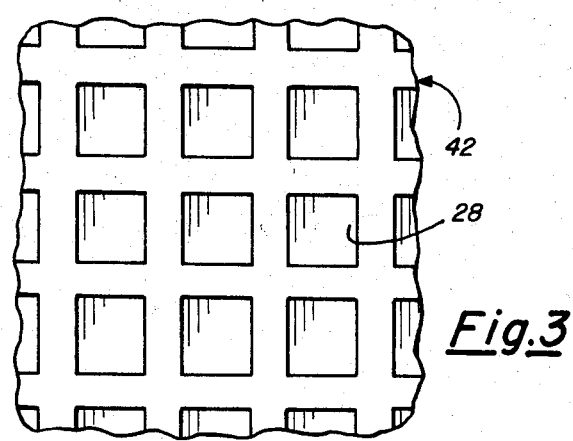
Fig.3
Fig.2
INVENTOR.
GILBERT J. ELDERBAUM
BY
ATTORNEY

PROCESS OF MANUFACTURING CAPACITORS IN MULTIPLE

BACKGROUND OF THE INVENTION

1. Field of the Invention

The invention is directed to the process of manufacturing capacitors, known in the art as "chip capacitors."

2. Description of the Prior Art

The present method, practices by the industry, of making capacitors is to employ greenware ceramic. The ceramic is cut into strips and conductor coating is silk-screened on the ceramic using precious metal, such as platinum, as a base metal. The coated strips are then laminated. The top and bottom of the laminated structure are provided with uncured greenware ceramic. After severing, the structures are fired to cure the ceramic. The opposite ends of the structures are then dipped in silver and fired in a silver kiln at 1400° F. Each capacitor must be separately tested to determine its capacitance.

Such method varies between 14 percent and 20 percent in unit size between unfired and fired, and this variation effects adverse yield rates and also results in the inability to produce precision units. The mortality rate is approximately 50 percent.

SUMMARY OF THE INVENTION

The invention relates to the process of manufacturing capacitors, particularly highly needed chip capacitors having extraordinarily small volume per unit capacitance. The process includes forming a sheet of composite material which, when severed, provides a multitude of perfected capacitors, each having substantially the same capacitance. Prior to severing the sheet into capacitor units, one electrical test only is necessary for testing capacitance of all thereafter severed capacitor units. By this process the individual application of electric current conducting material and separate testing of each capacitor are eliminated.

BRIEF DESCRIPTION OF THE DRAWING

Other features and the advantages of the present invention will be apparent from the following description, reference being had to the accompanying drawing wherein a preferred embodiment of the invention is illustrated.

FIG. 1 is a side view, partly in section, of a capacitor made in accordance with the process of the present invention, the view being greatly enlarged, in the section being taken along line 1–1 of FIG. 2;

FIG. 2 is a top plan view of the capacitor shown in FIG. 1;

FIG. 3 is a top plan view of a fragment of the dielectric sheet showing recesses which are to receive the electric current conducting material;

FIG. 4 is a top plan view of the same dielectric sheet but showing mounts surrounding the recesses; and recesses surrounding the mounts; and FIG. 5 is a fragmentary sectional view taken along line 5–5 of FIG. 4, but on a larger scale.

DESCRIPTION OF THE PREFERRED EMBODIMENT

Referring more in detail to the drawing and particularly to FIG. 1, the capacitor 20 includes two electric current conductors 22 and 24 which are separated from one another by dielectric material 26. These conductors are connectable with terminals (not shown). At least one, and as herein shown, both conductors are disposed in recesses 28 and 30 in dielectric material 32. The separating portion 26 is formed integrally with the material 32. The upper conductor 22 includes a flange portion 34 which covers the top of the dielectric material 32 and includes a downwardly extending band 36 which surrounds the upper part of material 32. The lower conductor is provided with a flange portion 38 which covers the bottom of material 32 and includes an upwardly extending band 40 which surrounds the lower part of material 32. These conductors are suitably connected with terminals (not shown).

The capacitors are formed in multiple. The process comprises finishing a dielectric sheet designated generally 42 so that the sides are parallel. Then electric current conducting material is caused to adhere to the sides and thereafter the sheet is severed to provide a multitude of capacitors. Before applying the conducting material to the dielectric sheet, at least one side, and as herein shown, both sides are formed with a multitude of recesses, those at the top of the sheet being shown at 28 and those at the bottom being shown at 30. A webb 26 of the sheet 42 separates a pair of recesses 28 and 30. In the embodiment illustrated, the top and bottom recesses are aligned, the bottoms of the top recesses being juxtaposed to the top of the bottom recesses, but are isolated from one another by the separating webb 26.

Recesses 44 are cut into the top surface of the sheet and like recesses 46 are cut into the bottom of the sheet. These recesses 44 and 46 surround the recesses 28 and 30 to thereby form mounting flanges 48 and 50 which surround, respectively, the upper part of recesses 28 and the lower part of recesses 30.

After cutting the multitude of recesses 28, 30, 44 and 46, electric current conducting material is applied to both sides of the sheet 42 to completely fill all of the recesses. This conducting material is in the form of a fluid, such as a paste, and includes powdered electric current conducting material such as metal, an ingredient, such as frit, which, when heated, causes the same to adhere to the dielectric material and the metal, and a combustible carrier for the ingredient and the metal. Thereafter, the sheet 42 and the current conducting material is heated sufficiently to cause the conducting material to adhere to the dielectric sheet and to cause oxidation of the carrier.

Then the entire sheet 42 is electrically tested for capacitance. If, for example, the sheet is sufficient to form 1000 capacitors, then the capacitance value is divided by 1000 to determine the capacitance of each capacitor.

After the capacitance test was made for the entire sheet 42, it is severed to form capacitors like that shown in FIG. 1.

Preferably the dielectric material is a mixture of fired titanates plus additives of the type which have a dielectric constant of 10 to 10,000 though the range generally used is between 30 and 6,000. The surfaces of the sheet 42 are ground, lapped and polished to achieve precision control of surface flatness, parallelism of opposite sides of the sheet and thickness of the sheet.

From the foregoing it is apparent that by virtue of the present invention i.e., by the use of sheets of precured dielectric material before applying the electrical current conducting material to the sheet, the need for the application of previous base metal, such as platinum, has been eliminated, for example, the conducting material can be silver or nickel.

The individual hand-dipped of both ends of the capacitors into the metal for forming the electrode junction has been eliminated. The individual testing of the capacitors has been eliminated since by the present method one test for the multitude is made possible while in sheet form. The elimination of individual hand-dipping and individual testing materially reduces labor costs and required manufacturing space is materially reduced.

Capacitors as produced by the process herein described are of substantially uniform capacitance. The variation of between 14 percent to 20 percent due to firing, as now present in the practice of the industry, materially affects the uniformity of capacitance of the capacitors. By using precured ceramic material, the thickness of the sheet and consequently the capacity of the resulting capacitors are not varied during the firing step.

The metal, after firing, reinforces the ceramic walls to not only provide for stability during the severing step, but also provides a rigid and rugged capacitor By the method herein disclosed, the percentage of failure to meet the desired specifications is minimal, i.e., merely a few percent.

It will be observed from FIGS. 1 and 5, that the width of recesses 44 and 46 are greater than twice the thickness of the band 36. Therefore, when desirable, the thickness of the band can be increased over that shown in FIG. 1, i.e., increased to half the width of the recesses 44 and 46 or to any desired lesser thickness.

If desirable, the sheet 42, after being filled with electric conducting material and fired, may be severed to provide units of multiple conductors 22 and 24.

Having described my invention I claim:

1. The steps in the process of manufacturing capacitors in multiple, which process consists in:
   A. applying electric current conducting material on one side of a sheet of dielectric material;
   B. forming a plurality of recesses on the other side of the dielectric material, which recesses extend to juxtaposed relationship to, but isolated from, the electric current conducting material on said one side of the sheet;
   C. inserting electric current conducting material into the recesses;
   D. the severing the sheet in a manner to form capacitors in unit form, each unit including at least one of the recesses containing the electric conducting material and dielectric material surrounding the same 2. The steps in the process as defined in claim 1, characterized in that the dielectric material is formed of a cured ceramic.

3. The steps in the process as defined in claim 1, characterized in that the electric conducting material is in the form of a fluid containing an ingredient which, when heated permanently adheres to the dielectric material and the electric conducting material and said ingredient, and further characterized to include the step of
   E. heating the fluid prior to the severing step to effect oxidation of the carrier and to effect adherence of the ingredient to the dielectric material.

4. The steps in the process as defined in claim 1, characterized in that the step (A) consists in:
   1. forming a plurality of recesses in said one side of the dielectric sheet, which recesses are juxtaposed, but isolated from the recesses in said one side of the dielectric sheet
   2. inserting electric current conducting material into the recesses in said one side of the sheet.

5. The steps in the process as defined in claim 1, characterized to include the step of
   E. prior to the step (C), removing material from the performing to form mounts of dielectric material surrounding the recesses and to form recesses surrounding the mounts, and the inserting electric current conducting material into the latter recesses simultaneous when performing the step (C).

6. The steps in the process as defined in claim 4, characterized to include the steps of:
   E. prior to the steps of inserting electric current conducting material into the recesses, removing material from the sheet to form mounts of dielectric material surrounding the recesses and to form recesses surrounding the mounts, and the inserting electric current conducting material onto the latter recesses while performing the steps of inserting electric current conducting material in the other recesses.

7. The steps in the process as defined in claim 5, characterized in that the dielectric material is in the form of a cured ceramic.

8. The steps in the process as defined in claim 6 characterized in that the dielectric material is in the form of a cured ceramic.

9. The steps in the process as defined in claim 5, characterized in that the dielectric material is in the form of a cured ceramic, and further characterized in that the electric current conducting material is in the form of a fluid containing an ingredient which when heated permanently adheres to the dielectric material and the electric current conducting material, and containing a combustible carrier for supporting the electric current conducting material and said ingredient; and further characterized to include the steps of:
   E. heating the fluid prior to the severing step to effect oxidation of the carrier and to effect adherence of the conducting material to the ingredient and the adherence of the ingredient to the dielectric material.

10. The steps in the process as defied in claim 6, characterized in that the dielectric material was in the form of a cured ceramic, and further characterized in that the electric current conducting material is in the form of a fluid containing an ingredient which when heated permanently adheres to the dielectric material and the electric current conducting material, and containing a combustible carrier for supporting the electric current material and said ingredient; and further characterized to include the step of
   E. heating the fluid prior to the severing step to effect oxidation of the carrier and to effect adherence of the conducting material to the ingredient and the adherence of the ingredient to the dielectric material.